United States Patent
Rog et al.

(10) Patent No.: US 8,270,506 B2
(45) Date of Patent: Sep. 18, 2012

(54) METHOD AND APPARATUS FOR DECODING USING COMPLEX LATTICE REDUCTION IN A MULTIPLE ANTENNA SYSTEM

(75) Inventors: Andrey L. Rog, Moscow (RU); Sergey A. Goreinov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1117 days.

(21) Appl. No.: 12/146,627

(22) Filed: Jun. 26, 2008

(65) Prior Publication Data
US 2009/0003476 A1    Jan. 1, 2009

(30) Foreign Application Priority Data

Jun. 26, 2007   (RU) ................................. 2007123737
Jun. 10, 2008   (KR) ............................. 2008-0054129

(51) Int. Cl.
*H04K 1/10* (2006.01)
(52) U.S. Cl. ......... 375/260; 375/267; 375/347; 375/340
(58) Field of Classification Search .................... 375/260
See application file for complete search history.

(56) References Cited

U.S. PATENT DOCUMENTS

| | | | |
|---|---|---|---|
| 6,724,843 B1 * | 4/2004 | Clarkson et al. | 375/347 |
| 2002/0154704 A1 * | 10/2002 | Reshef | 375/262 |
| 2008/0304586 A1 * | 12/2008 | Molnar | 375/260 |

FOREIGN PATENT DOCUMENTS

| | | |
|---|---|---|
| KR | 10-0373299 B1 | 2/2003 |
| KR | 10-2007-0019345 A | 2/2007 |
| KR | 10-2007-0059659 A | 6/2007 |

* cited by examiner

*Primary Examiner* — Lihong Yu
(74) *Attorney, Agent, or Firm* — Jefferson IP Law, LLP

(57) ABSTRACT

A method and apparatus for Multiple-Input Multiple-Output (MIMO) signal decoding using complex Lattice Reduction (LR) in a multiple antenna system is provided. The method provides MIMO signal decoding with increased operating speed using a transformation of reducing the lattice basis directly to a complex channel matrix that has a smaller size in comparison with a conventional matrix, which decreases the computational complexity of the LR transformation, as well as using a procedure of permutating columns of the channel matrix only twice without binding to the procedure of reducing off-diagonal elements of the matrix R, namely prior and after the procedure of reducing. Moreover, the new method for MIMO signal decoding has its output soft decisions.

14 Claims, 3 Drawing Sheets

METHOD AND APPARATUS FOR DECODING USING COMPLEX LATTICE REDUCTION IN A MULTIPLE ANTENNA SYSTEM

PRIORITY

This application claims the benefit under 35 U.S.C. §19(a) of a Russian patent application filed in the Russian Patent Office on Jun. 26, 2007 and assigned Serial No. RU2007123737, and of a Korean patent application filed in the Korean Intellectual Property Office on Jun. 10, 2008 and assigned Serial No. 2008-54129, the entire disclosures of each of which are hereby incorporated by reference.

BACKGROUND OF THE INVENTION

1. Field of the Invention

The invention relates to the field of wireless Multiple-Input Multiple-Output (MIMO) communication systems. More particularly, the present invention relates to a method and apparatus for MIMO decoding with outputting soft decisions using the complex-valued integer lattices, specifically in the case of two transmitting and two receiving antennas.

2. Description of the Related Art

Multiple-Input Multiple-Output (MIMO) systems represent multiple-antenna receiving/transmitting systems that possess a series of advantages over conventional single-antenna systems. More particularly, the use of multiple-antenna systems allows increasing a communication channel capacity. Since each receiving antenna at a receiving side receives a signal being a superposition of signals transmitted by all transmitting antennas, in decoding the received signal it is necessary to take into account all elements of a channel matrix characterizing a signal propagation channel from a transmitter to a receiver.

There are many methods for signal decoding in a conventional MIMO system, such as a Zero Forcing (ZF), a Minimum Mean Square Error (MMSE), an Ordered Serial Interference Cancellation (OSIC) etc, most of which are lower in accuracy than the most optimal Maximum-Likelihood (ML) technique. Moreover, many methods require significant computational cost. The latter note is especially topical for the maximum-likelihood technique.

The use of techniques of Lattice Reduction (LR) is disclosed in decoding algorithms for MIMO systems. The same work notes that decisions obtained using the LR techniques are close to the ML decisions, and the computational complexity in this case is comparable with the complexity of the ZF and MMSE OSIC techniques.

A conventional method disclosed in U.S. Pat. No. 6,724,843. This method comprises estimating a communication channel, obtaining a channel matrix H, and decoding the received signal using the LR technique. Here, since the above LR technique was initially intended for real matrices and vectors, and the channel matrix of the communication system includes complex vectors, in order to transition from complex values to real ones, the "unfolding" transform has been proposed as in Equation 1 below:

$$H \to \begin{bmatrix} \Re H & -\Im H \\ \Im H & \Re H \end{bmatrix}, x \to \begin{bmatrix} \Re x \\ \Im x \end{bmatrix},$$ [Equation 1]

which maintains a result of the matrix-vector multiplication Hx. H refers to a channel matrix, x refers to a transmitted vector, $\Re$ refers to a real part, and $\Im$ refers to an imaginary part.

The method proposed in U.S. Pat. No. 6,724,843 utilizes an LLL transform for the basis reduction of the vector space of columns of the channel matrix H. The original basis is formed by columns of the matrix Q from the QR-decomposition of the channel matrix H. The LLL transform consists of two main procedures:

decreasing sequentially the off-diagonal elements of the matrix R, meanwhile performing elementary transformations of columns [3, 5], carrying out the check of the so called reducedness ratio $$r_{kk}^2 + r_{k-1,k}^2 \geq \frac{3}{4} r_{k-1,k-1}^2$$

which could be interpreted as a relative growth of diagonal and neighbor to diagonal elements of the matrix R depending on their column indices, where $r_{i,j}$ refers to an element of the matrix R in the QR-decomposition. If the reducedness ratio is not accomplished, a second procedure is carried out, otherwise the process proceeds to the next column;

carrying out a transposition of two adjacent columns k−1, k of the matrix R (herewith, the triangularity of the R is deteriorated) and optional transformation that recovers the triangle form of the R. In so doing, it is possible that the reducedness ratio for the columns k−2, k−1 is deteriorated. In this case, the second procedure is carried out for them, too. Thus, the second procedure can be spread onto any of columns already processed at the step 1. As a result, diagonal elements of the columns 1, . . . , k of the R are obtained in ascending order in the sense of the reducedness ratio.

The disadvantage of the method described in U.S. Pat. No. 6,724,843 is in its great computational complexity due to several facts. First, the real channel matrix that is formed as a result of the "unfolding" has a great size, and the QR-decomposition requires computations proportional to the third power of this size. Second, the procedure of the column transposition with the subsequent recovering of the R triangularity associated with the reduction procedure is carried out multiple times and is also therefore costly from the computational viewpoint.

Another disadvantage relates to the type of the obtained decision. The method of U.S. Pat. No. 6,724,843 is a method of the V-BLAST type, i.e., the symbol decoding happens sequentially, layer by layer, by rounding to the nearest element of the modulation map. Symbols thus obtained are commonly referred to as hard decisions. The disadvantage of the V-BLAST is in propagating an error that appears due to a wrong symbol decoding in one of the layers to all subsequent layers. The wrong decoding occurs when the element of the modulation map nearest to the calculated symbol value does not coincide with the actually transmitted symbol. Since the rounding process affects nontrivially onto decoding in the subsequent layers, it is very difficult to build a correct estimation of the probability of the bit output decision (which estimation is also referred to as a soft decision). Thus, in many realizations, V-BLAST yields only hard decisions when the bit probability is not taken into account at all. Other methods, for example ML and modifications thereof, comprise the probabilistic error estimation and yield soft decisions, but the complexity of these techniques in comparison with the conventional MMSE detector is extremely high.

Many methods for correcting errors, such as convolution codes, turbo codes, low-density parity check codes, exist which are used in modern communication systems and which allow correcting errors effectively at the output of MIMO decoders. All of them work much more effectively when soft bit decisions having correctly calculated probability of the output bits are entered as the input data. Thus, the problem of obtaining correct soft decisions at the output of the MIMO decoder becomes very important. Not less important is to keep the computational complexity of the MIMO decoder at the level of ZF OSIC or MMSE OSIC filters.

Accordingly, there exists a need for a decoding apparatus and method for reducing the computational complexity while obtaining sufficient performance in a LR wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for MIMO decoding with outputting soft decisions using the complex-valued integer lattices, specifically in the case of two transmitting and two receiving antennas.

Another aspect of the present invention is to provide an apparatus and method for signal decoding having an increased operational speed by employing a reduction transformation of the basis of the Lattice Reduction (LR) directly to a complex channel matrix that has less size in comparison with a real matrix, which reduces the computational complexity of the LR-transformation, as well as by using the procedure for transposing the channel matrix columns only twice without binding to the reduction of the off-diagonal elements of the matrix R, namely, prior to and after the reduction procedure. Moreover, the new method for MIMO decoding must have soft decisions at its output rather than hard decisions as in the method of U.S. Pat. No. 6,724,843.

In accordance with an aspect of the present invention, a method for MIMO signal decoding is provided. The method comprises receiving by two receiving antennas a signal transmitted by two transmitting antennas, estimating a signal propagation channel, obtaining a channel matrix H in which each element characterizes a propagation channel between each transmitting and each receiving antennas, supplementing the channel matrix H with elements of the identity matrix multiplied by the estimation of the signal-to-noise ratio to the power −0.5, thus obtaining an extended channel matrix $\hat{H}$, and decoding at least a portion of symbols of the received signal. When decoding, a method of reducing a column space basis of the matrix $\hat{H}$ is provided. The method of reducing comprises performing a complex ordered QR decomposition of the extended channel matrix $\hat{H}$, thus obtaining a permutation matrix $P_1$ and a top-triangle matrix $R_1$, and reducing the off-diagonal elements of the matrix $R_1$. The method of reducing also comprises performing for each column of the matrix $R_1$ beginning from the second one, if an absolute value of a real or imaginary component of an off-diagonal element in a column is greater than 1, subtracting from the current column the previous columns of the $R_1$ multiplied by corresponding complex integers that are obtained by rounding off real and imaginary parts of the decreased off-diagonal element, herewith an index of the column being subtracted is defined by an index of a row of the element being decreased, determining simultaneously a matrix T that corresponds the matrix R1 with decreased off-diagonal elements and meets a condition $T=R_1^{-1}R_{1new}$, where $R_{1new}$ refers to a matrix $R_1$ with the decreased off-diagonal elements, performing a complex ordered QR decomposition of a matrix $(\hat{H}P_1T)$, thus obtaining a permutation matrix $P_2$ and a top-triangle matrix $R_2$, determining the received symbols, and performing an inversion method of the complex matrix $(\hat{H}P_1TP_2)$. The inversion method comprises determining the received symbols at a modified symbol lattice, deriving several candidates that, on the one hand, are close to the obtained component of the decision at the modified lattice in the sense of the Euclidean distance, and, on the other hand, are images of possible symbols of the original lattice, estimating, for each candidate, a probability thereof according to the Euclidean distance to the obtained component of the decision when assuming the probability density as Gaussian, deriving, from the pairs of the candidates at the first and second layers by the preorder tree search, vectors-candidates, attributing to these vectors-candidates the probabilities by means of multiplying the component probabilities, and calculating bit probabilities, transforming preliminary the vectors-candidates to vectors of the original basis.

In accordance with another aspect of the present invention, an apparatus for signal decoding in a 2×2 MIMO antenna system is provided. The apparatus comprises antennas for receiving one or more symbols, and a decoder for decoding for the received symbols at least partially by determining the nearest point in a lattice corresponding to at least a subset of the modulation map used in symbol transmission, wherein the decoder utilizes an algorithm for reducing a basis in the complex space, thus determining approximately an orthogonal new basis for the lattice.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A method and apparatus of exemplary embodiments of the present invention will be described hereinafter for MIMO decoding with outputting soft decisions using the complex-valued integer lattices in a MIMO wireless communication system.

The technical results of exemplary embodiments of the present invention consist in increasing the operational speed and in increasing the accuracy of the method for MIMO signal decoding.

For a better understanding of the present invention, a detailed description of exemplary embodiments thereof is adduced hereinafter, accompanied with respective drawings.

Figure 1:
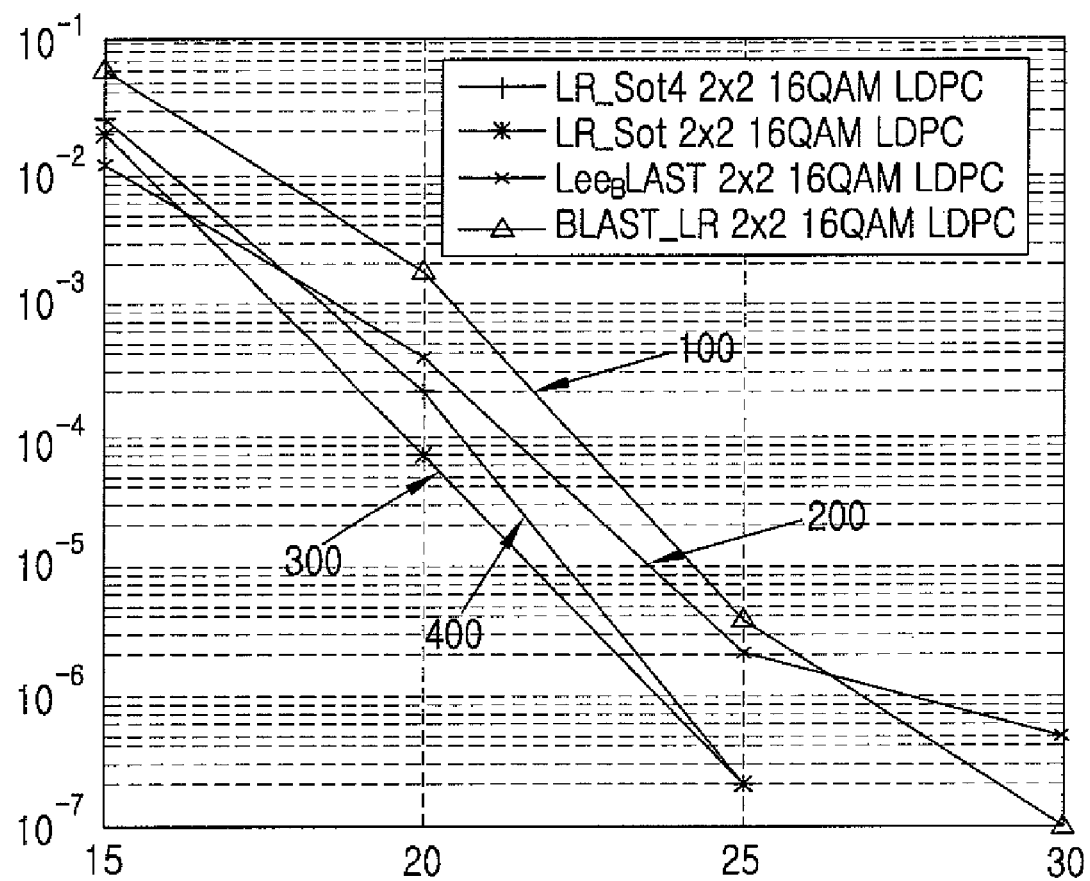
FIG. 1 is a graph illustrating a Bit Error Ratio (BER) of BLAST-LR, MMSE OSIC of the Lee algorithm (Lee-BLAST) and results according to an exemplary embodiment of the present invention.

FIG. 1 illustrates graphs of the BER of U.S. Pat. No. 6,724,843 (BLAST-LR), MMSE OSIC of the Lee algorithm (Lee-BLAST) and MIMO signal decoding (LR-Soft and LR-Soft4) made according to an exemplary embodiment of the present invention. The 2×2 MIMO-OFDM system having the LDPC decoder with respect to a value of the signal-to-noise ratio is exemplary.

Referring to FIG. 1, the channel model corresponds to a SUI-3 model. The LR-Soft4 variant differs from the LR-Soft variant by a number of candidates for the second layer, which is, respectively, one and four.

Line 100 corresponds to the BLAST-LR, line 200 corresponds to the Lee algorithm, and lines 300 and 400 correspond to an exemplary embodiment of present invention. The drawing illustrates a reduction of the BER (decrease of the probability of the bit error at the system output).

Figure 2:
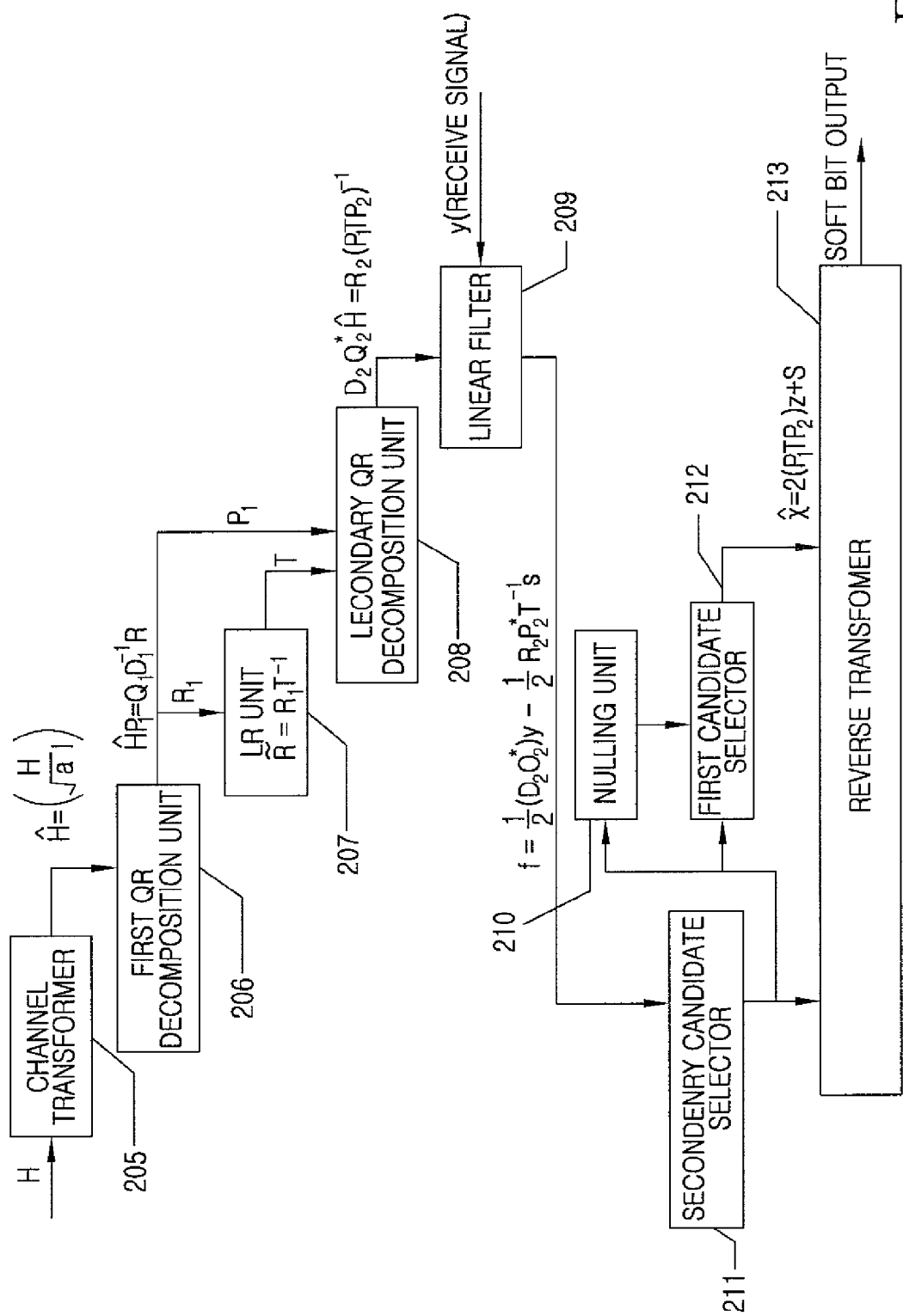
FIG. 2 is a block diagram illustrating a structure of an apparatus for decoding in a MIMO wireless communication system according to an exemplary embodiment of the present invention.

FIG. 2 is a block diagram of an MMSE OSIC Soft LR decoder made according to an exemplary embodiment of the present invention. In an exemplary implementation, the modulation map may be a 16-QAM.

Referring to FIG. 2, the MMSE OSIC Soft LR decoder includes a channel transformer 205, a first QR decomposition unit 206, a LR unit 207, a secondary QR decomposition unit 208, a linear filter 209, a nulling unit 210, a first candidate selector 212 and a secondary candidate selector 211.

The channel transformer 205 receives a signal transmitted by two transmitting antennas using two receiving antennas. Then, a signal propagation channel is estimated. In this example, the signal propagation channel is the Relay two-dimensional MIMO fading channel that has two transmitters and two receivers, and is characterized by a channel matrix H of a size of 2×2 as shown in Equation 2 below:

$$y = Hx + v.$$ [Equation 2]

where, y refers to a received vector signal, x refers to a transmitted vector signal, an H refers to a channel matrix. Here, each element of the matrix H characterizes a propagation channel between each transmitting and each receiving antenna.

The mean energy of the symbol transmitted via one transmitter may be equal to $E_s = E(|x|^2)/2$, and the noise vector v may have the Gaussian distribution having the zero mean and the dispersion $\sigma^2$. The inverse value of the Signal-to-Noise Ratio (SNR) is defined as $\alpha = \sigma^2/E_s$. The input data are H, $\alpha$ and y.

The channel transformer 205 obtains a received signal y, a channel matrix H, and an inverse value of the SNR $\alpha$, and outputs an extended matrix $\hat{H}$ to a first QR decomposition, after transforming of the channel matrix H into the extended channel matrix $\hat{H}$. The extended matrix is expressed as shown in Equation 3 below:

$$\hat{H} = \begin{bmatrix} H \\ \sqrt{\alpha} I \end{bmatrix}$$ [Equation 3]

where H refers to a channel matrix, I refers to an identity matrix, $\alpha$ refers to an inverse value of the SNR.

The first QR decomposition unit 206 decomposes, using the sorted QR decomposition, the extended channel matrix $\hat{H}$ into Equation 4:

$$\begin{bmatrix} H \\ \sqrt{\alpha} I \end{bmatrix} P_1 = Q_1 D_1^{-1} R_1$$ [Equation 4]

Here, the index 1 illustrates that the ordered QR decomposition is used in the method for the first time. Matrices P, Q, D, and R refer to, respectively, a permutation matrix, an orthogonal matrix, a diagonal matrix and an upper triangular matrix. The matrices P, D, R have the size 2×2, the matrix Q has the size 4×2.

The LR unit 207 decreases for the second column of the $R_1$, (greater than one in absolute value) off-diagonal elements of the matrix $R_1$, and then the previous columns of the $R_1$ multiplied by corresponding integers are subtracted from the current column. For example, if the absolute value of one of components $r_{jk}$ (real or imaginary) is greater than 1, the real and imaginary parts of the $r_{jk}$ are rounded off, thus obtaining a complex integer quantity $\mu$, and the column j is $\mu$ times subtracted from the column k (i.e., each element of the column j is multiplied by the integer complex $\mu$ and subtracted from the corresponding element of the column k). In so doing, the off-diagonal elements of columns of the matrix $R_1$ are processed sequentially upward from the diagonal. Simultaneously with altering (decreasing of the off-diagonal elements) the matrix $R_1$, the transforming matrix T such that $R_1 T^{-1}$ remains unchanged. The subtraction of the column having the index j from the column k results in the following transformation of the matrices $R_1$ and T:

$$R_{1new}(m, k) = R_1(m, k) - \mu R_1(m, j)$$

$$T_{1new}(m, k) = T_1(m, k) - \mu T_1(m, j)$$ [Equation 5]

where, m refers to an index of symbol. k, j refer to an index of column in matrix. Here, initially (in the beginning of LR algorithm), the matrix T is an identity matrix of the size of 2×2. It should be noted as well that the T at every step would be a complex integer top unitriangular matrix. The intent of this step is for the matrix $R_1 T = \tilde{R}_1$ to become closer to the normal one than the matrix R1, therefore the mutual influence of the layers in solving the system with the matrix $\tilde{R}_1$ is less than in solving the system with the matrix $R_1$.

The secondary QR decomposition unit 208 decomposes the matrix $$\begin{bmatrix} H \\ \sqrt{\alpha} I \end{bmatrix} P_1 T$$

into Equation 6 below, using the sorted QR decomposition:

$$\begin{bmatrix} H \\ \sqrt{\alpha} I \end{bmatrix} P_1 T P_2 = Q_2 D_2^{-1} R_2 \qquad \text{[Equation 6]}$$

The linear filter 209 performs filtering of the received signal y and outputs the filtered y. The filtered y is expressed as shown in Equation 7 below:

$$f = \frac{1}{2} D_2 \hat{Q}_2^* y - R_2 \Pi^{-1} s \qquad \text{[Equation 7]}$$

where $\hat{Q}_2 = [I \; 0] Q_2$ refers to the first two rows of the matrix Q2, the vector $s = e + \sqrt{-1} e$, the vector e has the both components equal to one, and the matrix $\Pi = 2 P_1 T P_2$. It is important that the matrix $$\frac{1}{2} \Pi$$

and the inverse matrix thereof are complex-valued integer-valued matrices.

The nulling unit 210 solves $R_2 z = f$ with building candidates and estimations of their probabilities at each layer as follows. For the order two, the permutation matrix $P_2$ can take only two possible values. The permutation corresponding to the matrix $P_2$ is either trivial or the reverse permutation. If the permutation is trivial, then the component $z_2$ minus the noise portion belongs to a complex-valued integer-valued plurality $\Omega$, having, in the example with the 16-QAM, $\Omega = \Theta + \sqrt{-1} \Theta$, where $\Theta = \{-2, -1, 0, 1\}$. Four elements of the $\Omega$ nearest to the $z_2$ in the Euclidean metric (referred to as candidates) are selected, and conditional probabilities are assigned to them according to the equation $$\rho(z_2 | \hat{z}_2 = s) = \frac{1}{\sqrt{\pi \sigma_v^2}} \exp\left(-\frac{\|z_2 - s\|^2}{\sigma_v^2}\right) \qquad \text{[Equation 8]}$$

where $\hat{z}_2$ refers to a component $z_2$ minus the noise portion, and s refers to an element of the $\Omega$. These probabilities are normalized on the assumption that the selected four candidates form exhaustive events. Each candidate is used in the reverse substitution in solving the above system with the matrix $R_2$, and the value x1 being obtained is also approximated by four (or one in another variant of the method) elements of the $\Omega$ nearest to the x1 in the Euclidean metric. Here are calculating formulae: calculating $z_1 = f_1 - r_{12} \hat{z}_2$, where $r_{12}$ is an off-diagonal element of the matrix $R_2$, and $\hat{z}_2$ is the current candidate; calculating $x_1 = z_1 + t_{12} \hat{z}_2$; and determining four (or one) of the best approximations of $x_1$ from the $\Omega$ in the Euclidean norm; one of such approximations being designated as $\hat{x}_1$. The vector-candidate corresponding to $\hat{z}_2$ is $P_1(\hat{x}_1, \hat{z}_2)^T$, and a probability in the form of a product of values ([Equation 8]), calculated for every component of the vector-candidate, is assigned to the vector-candidate. Or else, the component $z_2$ minus the noise portion belongs to a more complex set, namely $\Omega - t_{12} \Omega$, where $t_{12}$ is the element of the matrix T in the position (1, 2). Geometrically, this is an aggregate of sixteen copies of the $\Omega$ shifted by constants. It is necessary to make all operations mentioned for the case of the trivial permutation $P_2$ beginning from the four elements nearest to the $z_2$ in the Euclidean metric, taking into account that the approximating set is more complex. Since the complete enumeration of 256 elements could be difficult, in the beginning, four copies of the $\Omega$ nearest to the $z_2$ in the Euclidean metric are selected, and four nearest elements are selected in each of copies, and sixteen elements being obtained are sorted with retention of the four nearest elements. If $|t_{12}| < 3$, then the copies of the $\Omega$ converge forming no gaps at the complex integer-valued lattice, and a simple decision on selection of four candidates exists: it is necessary to check each of eight nearest neighbors. The simulation shows that said inequality is fulfilled in a great number of instances. Further, for each candidate $\hat{z}_2$, the $z_1 = f_1 - r_{12} \hat{z}_2$ is created, four (or one) candidates $\hat{x}_2 \in \Omega$ are calculated for the $z_1$ and the component $\hat{x}_1 = \hat{z}_2 + t_{12} \hat{x}_2$ is calculated. If $\hat{x}_1 \notin \Omega$, then the pair $\hat{x}_1, \hat{x}_2$ is recognized as bad, otherwise, if $\hat{x}_1 \in \Omega$ the vector-candidate $P_1(\hat{x}_1, \hat{z}_2)$ is created, a probability in the form of a product of values [Equation 8] calculated for each component of the vector-candidate being assigned to the vector-candidate.

The first candidate selector 212 and secondary candidate selector 211 calculate bit probabilities using Gray codes with summarizing for every bit the probabilities of vector-candidates in which this bit is equal to one, and normalizing the obtained values to the sum of all bit probabilities.

The basis for the method is associated with the fact that there is a priori information that an actually sent vector $\tilde{x}$ has components from the preset modulation map, for example a 16-QAM. Let us introduce a vector $$\hat{x} = \frac{\tilde{x} - s}{2}$$

in order that the $\hat{x}$ having components from the complex-valued integer-valued set $\Omega$ with the minimal distance between neighbors corresponds the really sent vector. A hard decision results by substituting the two last steps with the following prescriptions.

First, solving a linear system $R_2 z = f$ with rounding the decision at each layer to the nearest complex-valued integer. Designating the obtained decision vector as $\hat{z}$.

Second, outputting the "hard" decision $\hat{x} = \Pi \hat{z} + s$.

The key property of the LR technique is as follows: the vectors $\hat{x}$ and $\hat{z}$ run one into another by a linear operator with a complex-valued integer-valued matrix:

$$\hat{z} = 2 \Pi^{-1} \hat{x} \qquad \text{[Equation 9]}$$

Just the formula (Equation 9) describes a transition from the original lattice to a modified one, and said property permits to reduce significantly a number of candidates for enumeration (in comparison with the maximal possible number).

In the two-dimensional instant, the formula (Equation 9) looks like the following as shown in Equation 10 below:

$$\hat{z}_{ip2(2)} = \hat{x}_{p1(2)}$$

$$z_{ip2(1)} = \hat{x}_{p1(1)} t_{12} x_{p1(2)} \qquad \text{[Equation 10]}$$

Here, p1(1) refers to an index of the unity element in the first column of the P1, p1(2) refers to an index of the unity element in the second column of the P1, ip2(1) refers to an index of the unity element in the first row of the P2, ip2(2) refers to an index of the unity element in the second row of the P2.

A number of candidates at every layer is an algorithm parameter, the simulation shows that the value four is sufficient for the first layer, and the value one is sufficient for the second layer.

The use of an exemplary embodiment of the present invention permits to improve the accuracy in estimating errors conditioned by a wrong hard decision, which results in improving the MIMO system characteristics. The latter is illustrated by the BER function in FIG. 1.

In an exemplary implementation, the ordered QR decomposition (SQRD) for the matrix of complex values is performed using the modified Gram-Schmidt technique:

$$H = QD^{-1}R, \quad \text{[Equation 11]}$$

where Q refers to an unitary matrix, D refers to a diagonal matrix, R refers to a top unitriangular matrix. The description of this technique in the general case of m×n is as follows.

Columns of the H refer to $h_1, h_2, \ldots, h_n$, Columns of the Q refer to $q_1, q_2, \ldots, q_n$. The matrix Q is altered step by step in the iteration process. The iteration steps k, k=1, ..., n, are considered. Then the Gram-Schmidt technique includes the following operations:

1. A column having the least Euclidean length is selected among columns $h_k, \ldots, h_n$, taking into account only components of columns having an indices greater than k, and this column is exchanged with the $h_k$. Thus, the columns are obtained which are disposed in a new order.

2. The Euclidean length of the $h_k$ is calculated and the inverse value of this length is recorded into the k-th diagonal element D. The normalized $h_k$ is recorded into the $q_k$.

3. The columns $h_{k-1}, \ldots, h_n$ are re-counted according to the equation $h_j = (I - q_k q^*_k) h_j$, where j=k+1, ..., n, the scalar product $q^*_k h_j$ being recorded into the kj position of the matrix R.

Further, the comparison of the computational complexity of an exemplary embodiment of the present method (referred to as CLR, Complex Lattice Reduction) with the method (referred to as Real Lattice Reduction (RLR)) and known decoding MIMO methods (ZF and MMSE) are adduced in connection with the system 2×2:

TABLE 1

|  | INIT STAGE | DECODE STAGE |
| --- | --- | --- |
| ZF: | 1r', 2d, 14m, 6a | 4m, 2a |
| MMSE | 1r', 4d, 24m, 14a | 4m, 2a |
| RLR | 4r', 346m', 278a' | 38m', 34a' |
| CLR | 4r', 55m, 34a | 9m, 11a | where a is the addition, d is the division, and r is the square root (or the inverse square root). The primed letters mean the operations with real numbers, the usual letters mean the complex operations.

Referring to Table 1, it can be seen that the difference in the computational complexity of the RLR method in comparison with the ZF and MMSE methods is sufficiently great, which is a serious obstacle in the way of implementing the RLR method.

As could be seen from the same Table 1 and FIG. 2, an exemplary embodiment of present method (CLR) allows to decrease significantly the number of computational operations in comparison with the RLR method while maintaining the same decision accuracy.

Even at m being equivalent to 4m' (which is a rather ineffective technique for realizing the complex multiplication), the CLR, at the stage of initialization, requires twice as little operations than the RLR.

The difference between LR and CLR consists also in a number of memory cells that should be moved:

TABLE 2

|  | INIT | DECODE |
| --- | --- | --- |
| LR | 208p, 628 | 16p, 72 |
| CLR | 52p, 93 | 5p, 20 |

Here, the letter p denotes "clean" operations for transferring the memory cells, which operations are used for copying the elements of the channel matrix prior to performing the ordered QR decomposition. In the case of the RLR they are added by the procedure of "unfolding" the complex channel matrix onto the four-block real matrix. The numbers without letters are the sum of previous table rows, since every operation assumes the data transfer.

Figure 3:
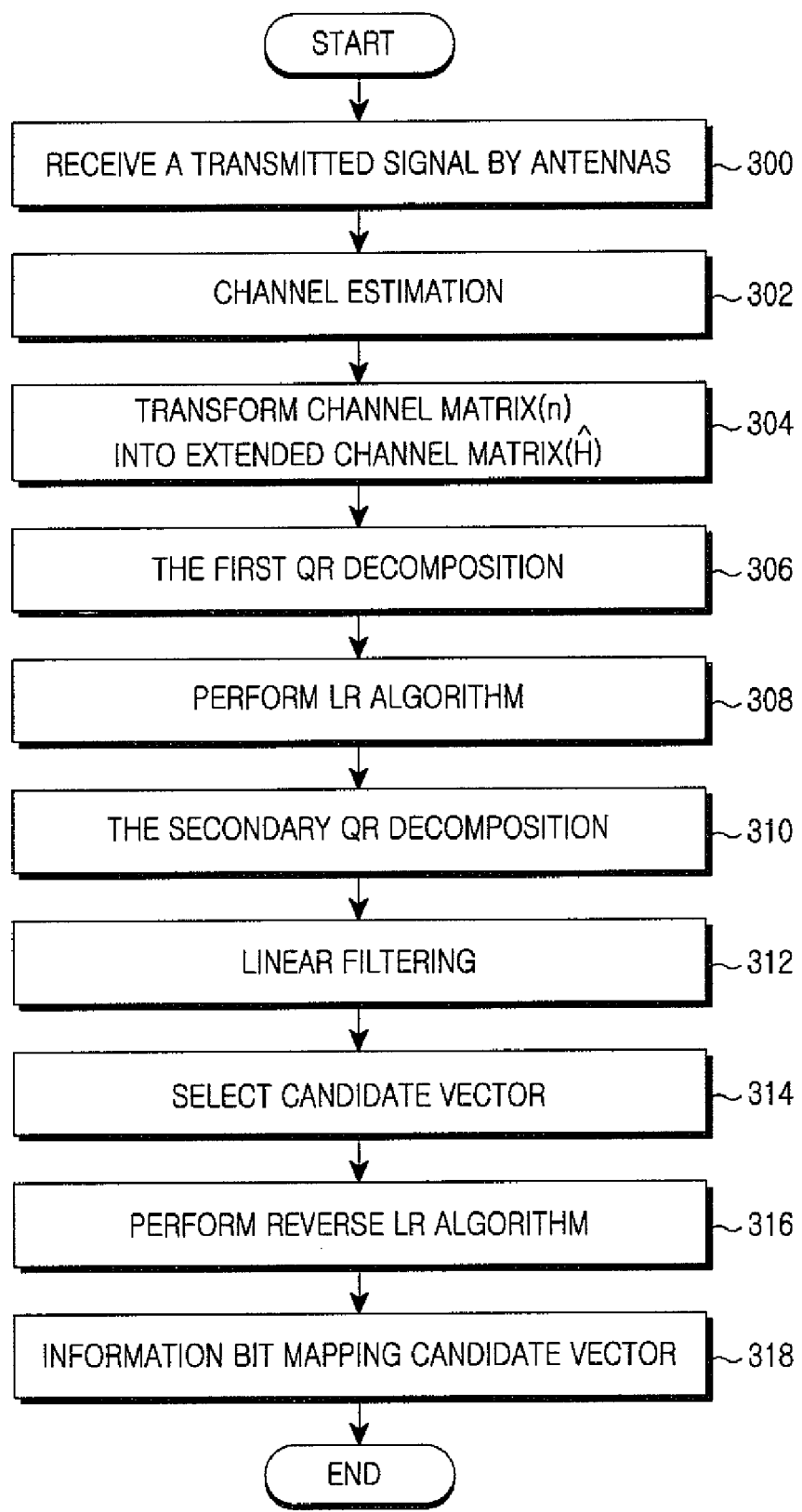
FIG. 3 is a flowchart of a decoding operation in a MIMO wireless communication system according to an exemplary embodiment of the present invention.

FIG. 3 is a flowchart of a decoding operation in a MIMO wireless communication system according to an exemplary embodiment of the present invention.

Referring to FIG. 3, the decoder receives a signal transmitted by two transmitting antennas using two receiving antennas. In step 302, a signal propagation channel is estimated (H).

In step 304, the decoder transforms the channel matrix H into an extended channel matrix $\hat{H}$.

In step 306, the decoder decomposes the extended channel matrix $\hat{H}$ into P1, Q1, D1 and R1 using the first sorted QR decomposition. P1, Q1, D1, and R1 refer to, respectively, a permutation matrix, an orthogonal matrix, a diagonal matrix and an upper triangular matrix.

In step 308, the decoder performs a complex Lattice Reduction (LR) algorithm. Namely, the decoder decreases for the second column of the $R_1$, great (greater than one in absolute value) off-diagonal elements of the matrix $R_1$, and then the previous columns of the $R_1$ multiplied by corresponding integers are subtracted from the current column. For example, if the absolute value of one of components $r_{jk}$ (real or imaginary) is greater than 1, the real and imaginary parts of the $r_{jk}$ are rounded off, thus obtaining a complex integer quantity μ, and the column j is μ times subtracted from the column k (i.e., each element of the column j is multiplied by the integer complex μ and subtracted from the corresponding element of the column k) (Referring to Equation 5).

In step 310, the decoder decomposes the matrix $$\begin{bmatrix} H \\ \sqrt{\alpha} I \end{bmatrix} P_1 T$$

into P2, Q2, D2 and R2 using the secondary sorted QR decomposition. P1, Q1, D1 and R1 refer to, respectively, a permutation matrix, an orthogonal matrix, a diagonal matrix and an upper triangular matrix. The T refers to a transforming matrix.

In step 312, the decoder performs filtering the received signal and outputs the filtered received signal (referring to Equation 7).

In step 314, the decoder selects the candidate vector, and in step 316, the decoder transform the signal of LR space into the signal of original space using reverse LR algorithm.

In step 318, the decoder outputs information bits mapping constellation dot in original space.

Then, the decoder ends the decoding operation.

The present invention can be used in radio-technical devices. Also, the present invention is simple enough from the viewpoint of complexity, and therefore can be used in the MIMO-OFDM systems.

While the invention has been shown and described with reference to certain exemplary embodiments thereof, it will be understood by those skilled in the art that various changes and modifications in form and details may be made therein without departing from the spirit and scope of the invention as defined by the appended claims and their equivalents.

What is claimed is:

1. A method for signal decoding in a 2×2 Multiple-Input Multiple-Output (MIMO) antenna system, the method comprising:
    receiving one or more symbols; and
    decoding the received symbols at least partially by determining a nearest point in a lattice corresponding to at least a subset of a modulation map used in symbol transmission,
    wherein in realizing the decoding operation, the decoding utilizes an algorithm for reducing a basis in the complex space of the lattice, thus determining approximately an orthogonal new basis for the lattice,
    wherein the decoding comprises performing a calculation of soft bit decisions by enumerating several candidates at every layer, and
    wherein the enumeration of the several candidates is determined via a preorder tree search realized in the 2×2 MIMO as a search in all possible permutation matrices with a delimitation set by a transformation between the original lattice and the reduced basis lattice, each matrix of permutation between lattices being complex-valued integer-valued, and with assigning probabilities to the candidates using a conditional probability function.

2. The method of claim 1, wherein the determination of the nearest point is based at least partially on componentwise rounding in the reduced basis lattice to at least one of a nearest integer-valued point and several integer-valued points referred to as candidates.

3. The method of claim 1, wherein the calculation of soft bit comprises assigning probabilities to the candidates using a conditional probability function.

4. The method of claim 1, wherein the decoding comprises:
    performing a complex ordered QR decomposition of an extended complex-valued channel matrix $\hat{H}$;
    reducing the off-diagonal elements of a matrix $R_1$ column by column from left to right and within each column from a diagonal element upward to an element of a first row by subtracting a previous column of a row index corresponding to the matrix $R_1$ of a corresponding off-diagonal element of the matrix $R_1$ being reduced, each column being taken with a coefficient that is a complex-valued integer resulting from rounding the real and imaginary parts of the off-diagonal element of the matrix $R_1$ being reduced, herewith this process is accompanied with building a matrix T such that $T=R_1^{-1}R_{1new}$;
    performing a complex ordered QR decomposition of a complex-valued modified channel matrix ($\hat{H}P_1 T$);
    retaining a permutation matrix $P_2$ and a top-triangle matrix $R_2$ as a result; and
    transforming a received vector via multiplying by a matrix inverse to a complex-valued matrix ($\hat{H}P_1 TP_2$), which corresponds to a transition to a modified modulation map with integer-valued elements and a minimal distance between neighbor elements, by using a componentwise rounding of a complex-valued vector to several nearest integer points in the reduced basis lattice that are candidates, which number is determined by a current layer, determining candidate probabilities and, probabilities of vector components,
    wherein $P_1$ is a permutation matrix and $R_{1new}$ is a transformation of the matrix $R_1$.

5. The method of claim 4, wherein the extended complex-valued channel matrix is expressed as:

$$\hat{H} = \begin{bmatrix} H \\ \sqrt{\alpha}I \end{bmatrix}$$

where H refers to a channel matrix, I refers to an identity matrix, and a refers to an inverse value of a Signal-to-Noise Ratio (SNR).

6. The method of claim 4, wherein the performing of the complex ordered QR decomposition comprises performing the complex ordered QR decomposition by using a modified Gram-Schmidt technique.

7. The method of claim 6, wherein the modified Gram-Schmidt technique comprises an equation of $H=QD^{-1}R$,
    where Q refers to an unitary matrix, D refers to a diagonal matrix, R refers to a top unitriangular matrix.

8. An apparatus for signal decoding in a 2×2 Multiple-Input Multiple-Output (MIMO) antenna system, the apparatus comprising:
    antennas for receiving one or more symbols; and
    decoder for decoding the received symbols at least partially by determining a nearest point in a lattice corresponding to at least a subset of a modulation map used in symbol transmission,
    wherein the decoder utilizes an algorithm for reducing a basis in the complex space of the lattice, thus determines approximately an orthogonal new basis for the lattice,
    wherein the decoder performs a calculation of soft bit decisions by enumerating several candidates at every layer, and
    wherein the enumerating of the several candidates is determined via preorder tree search realized in the 2×2 MIMO as a search in all possible permutation matrices with a delimitation set by a transformation between the original lattice and the reduced basis lattice, each matrix of permutation between lattices being complex-valued integer-valued, and with assigning probabilities to the candidates using a conditional probability function.

9. The apparatus of claim 8, wherein the determination of the nearest point is based at least partially on componentwise rounding in the reduced basis lattice to at least one of a nearest integer-valued point and several integer-valued points referred to as candidates.

10. The apparatus of claim 9, wherein the decoder calculates the soft bit decisions by assigning probabilities to the candidates using a conditional probability function.

11. The apparatus of claim 8, wherein the decoder comprises:
    a first QR decomposition unit for performing a complex ordered QR decomposition of an extended complex-valued channel matrix $\hat{H}$;
    a Lattice Reduction (LR) unit for reducing the off-diagonal elements of a matrix $R_1$ column by column from left to right and within each column from a diagonal element upward to an element of a first row by subtracting a previous column of the matrix $R_1$ corresponding to a row index of a corresponding off-diagonal element of the matrix $R_1$ being reduced, each column being taken with a coefficient that is a complex-valued integer resulting from rounding the real and imaginary parts of the off-diagonal element of the matrix $R_1$ being reduced, herewith this process is accompanied with building a matrix T such that $T=R_1^{-1}R_{1new}$;

a secondary QR decomposition unit for performing a complex ordered QR decomposition of a complex-valued modified channel matrix ($\hat{H}P_1T$), for retaining a permutation matrix $P_2$ and a top-triangle matrix $R_2$ as a result; and a reverse transformer for transforming a received vector via multiplying by a matrix inverse to a complex-valued matrix ($\hat{H}P_1TP_2$), which corresponds to a transition to a modified modulation map with integer-valued elements and a minimal distance between neighbor elements, by using a componentwise rounding of a complex-valued vector to several nearest integer points in the reduced basis lattice that are candidates, which number is determined by a current layer, for determining candidate probabilities, and probabilities of vector components, wherein $P_1$ is a permutation matrix and $R_{1new}$ is a transformation of the matrix $R_1$.

12. The apparatus of claim 11, wherein the extended complex-valued channel matrix is expressed as:

$$\hat{H} = \begin{bmatrix} H \\ \sqrt{\alpha} I \end{bmatrix},$$

where H refers to a channel matrix, I refers to an identity matrix, and a refers to an inverse value of a Signal-to-Noise Ratio (SNR).

13. The apparatus of claim 11, wherein the first QR decomposition unit performs the complex ordered QR decomposition by using a modified Gram-Schmidt technique.

14. The apparatus of claim 13, wherein the modified Gram-Schmidt technique comprises an equation of $H=QD^{-1}R$, where Q refers to an unitary matrix, D refers to a diagonal matrix, R refers to a top unitriangular matrix.

* * * * *